United States Patent
Kalra et al.

(10) Patent No.: US 9,536,264 B2
(45) Date of Patent: Jan. 3, 2017

(54) HOST AGNOSTIC MESSAGING IN A CONTINUATION BASED RUNTIME

(75) Inventors: Vishal Kalra, Sammamish, WA (US); David R. Cliffe, Redmond, WA (US); Kenneth David Wolf, Seattle, WA (US); Leon Welicki, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 13/296,014

(22) Filed: Nov. 14, 2011

(65) Prior Publication Data

US 2013/0125136 A1     May 16, 2013

(51) Int. Cl.
*G06Q 40/04* (2012.01)
*G06F 9/54* (2006.01)

(52) U.S. Cl.
CPC .............. *G06Q 40/04* (2013.01); *G06F 9/541* (2013.01)

(58) Field of Classification Search
CPC ................................ G06Q 40/04; G06F 9/541
See application file for complete search history.

(56) References Cited

U.S. PATENT DOCUMENTS

| | | |
|---|---|---|
| 5,490,097 A | 2/1996 | Senson |
| 5,748,962 A | 5/1998 | Brechtel |
| 5,918,226 A | 6/1999 | Tarumi |
| 5,960,404 A | 9/1999 | Chaar |
| 5,999,910 A | 12/1999 | Rosenfeld |
| 5,999,911 A | 12/1999 | Berg |

(Continued)

FOREIGN PATENT DOCUMENTS

| | | |
|---|---|---|
| GB | 2396928 | 7/2004 |
| JP | 2003-331095 | 11/2003 |

(Continued)

OTHER PUBLICATIONS

Eberle, et al., "Implementation Architectures for Adaptive Workflow Management", In Proceedings of the Second International Conference on Adaptive and Self-Adaptive Systems and Applications, 2010, pp. 98-103.

(Continued)

*Primary Examiner* — Charles E Anya
(74) *Attorney, Agent, or Firm* — Ben Tabor; Kate Drakos; Micky Minhas

(57) ABSTRACT

Sending or receiving messages in a host agnostic way in a continuation based runtime. A method includes defining a contract between a continuation based runtime and host for sending or receiving a message. The contract defines one or more of: details about what should be included in the messages, operations for sending the message; operations for receiving the message, parameters for cancellation of inflight operations, or notifications about correlation information lifetime. The method further includes identifying a correlation handle. The correlation handle uniquely identifies an executing instance of an activity. The method further comprises identifying a bookmark. The bookmark defines where the continuation based runtime should resume after sending or receiving the message. The method further comprises calling the contract using the correlation handle and the bookmark to allow the message to be correctly routed by the host and for the continuation based runtime to be correctly resumed.

21 Claims, 7 Drawing Sheets

(56) References Cited

U.S. PATENT DOCUMENTS

| | | |
|---|---|---|
| 6,041,306 A | 3/2000 | Du et al. |
| 6,047,260 A | 4/2000 | Levinson |
| 6,065,009 A | 5/2000 | Leymann |
| 6,108,711 A | 8/2000 | Beck |
| 6,115,640 A | 9/2000 | Tarumi |
| 6,134,559 A | 10/2000 | Brumme |
| 6,151,583 A | 11/2000 | Ohmura |
| 6,253,369 B1 | 6/2001 | Cloud |
| 6,272,672 B1 | 8/2001 | Conway |
| 6,282,531 B1 | 8/2001 | Haughton |
| 6,308,224 B1 | 10/2001 | Leymann |
| 6,339,838 B1 | 1/2002 | Weinman |
| 6,397,191 B1 | 5/2002 | Notani |
| 6,434,568 B1 | 8/2002 | Bowman-Amuah |
| 6,442,528 B1 | 8/2002 | Notani |
| 6,473,794 B1 | 10/2002 | Guheen |
| 6,499,023 B1 | 12/2002 | Dong |
| 6,539,396 B1 | 3/2003 | Bowman |
| 6,578,006 B1 | 6/2003 | Saito |
| 6,675,133 B2 | 1/2004 | Knowles |
| 6,697,784 B2 | 2/2004 | Bacon |
| 6,769,113 B1 | 7/2004 | Bloom |
| 6,772,216 B1 | 8/2004 | Ankireddipally |
| 6,772,407 B1 | 8/2004 | Leymann |
| 6,801,227 B2 | 10/2004 | Bocionek |
| 6,820,118 B1 | 11/2004 | Leymann |
| 6,826,579 B1 | 11/2004 | Leymann |
| 6,839,062 B2 | 1/2005 | Aronson |
| 6,847,974 B2 | 1/2005 | Wachtel |
| 6,854,016 B1 | 2/2005 | Kraenzel |
| 6,877,153 B2 | 4/2005 | Konnersman |
| 6,941,514 B2 | 9/2005 | Bradford |
| 6,968,503 B1 | 11/2005 | Chang |
| 6,983,421 B1 | 1/2006 | Lahti |
| 7,069,536 B2 | 6/2006 | Yaung et al. |
| 7,120,800 B2 | 10/2006 | Ginter |
| 7,240,070 B1 | 7/2007 | Cheng |
| 7,370,335 B1 | 5/2008 | White et al. |
| 7,464,366 B2 | 12/2008 | Shukla et al. |
| 7,698,383 B2 | 4/2010 | Goring |
| 7,827,127 B2 | 11/2010 | Wolf et al. |
| 7,881,233 B2 | 2/2011 | Beiselin |
| 8,862,507 B2* | 10/2014 | Sandhu et al. ............. 705/35 |
| 2002/0016810 A1 | 2/2002 | Watanabe |
| 2002/0030703 A1 | 3/2002 | Robertson |
| 2002/0032775 A1 | 3/2002 | Venkataramaiah |
| 2002/0038450 A1 | 3/2002 | Kloppmann et al. |
| 2002/0065701 A1 | 5/2002 | Kim |
| 2002/0147611 A1 | 10/2002 | Greene |
| 2002/0161615 A1 | 10/2002 | Yui |
| 2002/0188597 A1 | 12/2002 | Kern |
| 2003/0004770 A1 | 1/2003 | Miller |
| 2003/0004771 A1 | 1/2003 | Yaung |
| 2003/0018627 A1 | 1/2003 | Turner |
| 2003/0023622 A1 | 1/2003 | Obermeyer |
| 2003/0033191 A1 | 2/2003 | Davies et al. |
| 2003/0055668 A1 | 3/2003 | Saran et al. |
| 2003/0078975 A1 | 4/2003 | Ouchi |
| 2003/0090514 A1 | 5/2003 | Cole |
| 2003/0105654 A1 | 6/2003 | Macleod |
| 2003/0135384 A1 | 7/2003 | Nguyen et al. |
| 2003/0181991 A1 | 9/2003 | Chau |
| 2003/0217053 A1 | 11/2003 | Bachman |
| 2003/0233374 A1 | 12/2003 | Spinola et al. |
| 2004/0015841 A1 | 1/2004 | Lepjian |
| 2004/0046789 A1 | 3/2004 | Inanoria |
| 2004/0068728 A1 | 4/2004 | Blevins |
| 2004/0078105 A1 | 4/2004 | Moon |
| 2004/0103014 A1 | 5/2004 | Teegan |
| 2004/0111430 A1 | 6/2004 | Hertling et al. |
| 2004/0117795 A1 | 6/2004 | Wang |
| 2004/0122853 A1 | 6/2004 | Moore |
| 2004/0138939 A1 | 7/2004 | Theiler |
| 2004/0162741 A1 | 8/2004 | Flaxer et al. |
| 2004/0199614 A1 | 10/2004 | Shenfield |
| 2004/0201604 A1 | 10/2004 | Kraenzel |
| 2004/0268338 A1 | 12/2004 | Gurpinar |
| 2005/0005259 A1 | 1/2005 | Avery |
| 2005/0015711 A1 | 1/2005 | Yamamoto |
| 2005/0044173 A1 | 2/2005 | Olander |
| 2005/0066287 A1 | 3/2005 | Tattrie |
| 2005/0096959 A1 | 5/2005 | Kumar et al. |
| 2005/0149908 A1 | 7/2005 | Kilanev |
| 2005/0203757 A1 | 9/2005 | Lei |
| 2005/0234902 A1 | 10/2005 | Meredith |
| 2006/0195347 A1* | 8/2006 | Bultmeyer et al. ............ 705/8 |
| 2006/0229924 A1 | 10/2006 | Aron et al. |
| 2006/0235964 A1 | 10/2006 | Childress et al. |
| 2006/0294048 A1* | 12/2006 | Shukla et al. ............ 707/1 |
| 2007/0156485 A1 | 7/2007 | Sanabria |
| 2007/0156486 A1 | 7/2007 | Sanabria |
| 2007/0156487 A1* | 7/2007 | Sanabria et al. ............ 705/8 |
| 2007/0156888 A1 | 7/2007 | Hilerio |
| 2007/0233969 A1 | 10/2007 | Shukla et al. |
| 2007/0234129 A1 | 10/2007 | Shukla et al. |
| 2007/0239498 A1 | 10/2007 | Shukla et al. |
| 2007/0239499 A1 | 10/2007 | Shukla et al. |
| 2007/0239505 A1 | 10/2007 | Shukla et al. |
| 2007/0245300 A1 | 10/2007 | Chan et al. |
| 2008/0040417 A1* | 2/2008 | Juncker ............ 709/201 |
| 2008/0114628 A1 | 5/2008 | Johnson |
| 2008/0127156 A1 | 5/2008 | Buza et al. |
| 2008/0167925 A1* | 7/2008 | Mehta et al. ............ 705/7 |
| 2008/0243524 A1 | 10/2008 | Agrawal et al. |
| 2010/0036859 A1* | 2/2010 | Pinto et al. ............ 707/100 |
| 2010/0070422 A1 | 3/2010 | Kikuchi et al. |
| 2010/0169862 A1* | 7/2010 | Wolf et al. ............ 717/117 |
| 2010/0306778 A1* | 12/2010 | Wolf et al. ............ 718/103 |
| 2010/0324948 A1 | 12/2010 | Kumar |
| 2016/0274869 A1 | 9/2016 | Wolf |

FOREIGN PATENT DOCUMENTS

| | | |
|---|---|---|
| JP | 2005-506618 | 3/2005 |
| JP | 2005-63253 | 7/2005 |
| KR | 1020010063810 | 7/2001 |
| WO | WO 02-21314 | 3/2002 |
| WO | WO 2004-055633 | 7/2004 |
| WO | WO 2004-059938 | 7/2004 |
| WO | WO 2004-077262 | 9/2004 |

OTHER PUBLICATIONS

Akram, et al., "Application of Business Process Execution Language to Scientific Workflows", In Proceedings of International Transactions on Systems and Applications, 2006, 14 pages.

"Oracle Workflow", In Proceedings of Oracle Developer's Guide, Sep. 2003, 622 pages.

"Softwaremaker", Retrieved on: Oct. 27, 2011, Available at: http://www.softwaremaker.net/blog/CategoryView,category,Windows%2BCommunication%2BFoundation%2B(WCF)%2Baka-%2BIndigo.aspx.

"SAP EDI Work Flow Set up Part Three", Retrieved on: Oct. 28, 2011, Available at: http://www.abapprogramming.net/2009_03_01_archive.html.

Muth, et al., "From Centralized Workflow Specification to Distributed Workflow Execution" Journal of intelligent Information Systems, Mar. 1998, vol. 10, No. 2, pp. 159-184, Abstract, 2 pages.

Kappel, et al., "A Framework for Workflow Management Systems Based on Objects, Rules and Roles", 2000, 5 pages.

Moldt, et al., "Pattern Based Workflow Design Using Reference Nets", Lecture Notes in Computer Science, Business Process Management: International Conference, BPM 2003, Jun. 26-27, 2003, pp. 246-260, Abstract, 2 pages.

D. Manolescu, "An Extensible Workflow Architecture with Objects and Patterns", Chapter 4 in Technology of Object-Oriented Languages, Systems, and Architectures, Theo D'Hondt, editor., 2003, 12 pages, Kluwer Academic Publishers.

Leymann, et al., "Workflow-based applications", IBM Systems Journal, 1997, vol. 36, No. I, pp. 102-123.

(56) References Cited

OTHER PUBLICATIONS

Huang, et al., "Unified enterprise modeling and integration environment based on Workflow technology", Proceedings of the Third International Conference (ICeCE2003), Oct. 2003, pp. 1000-1003.
Lond, et al., "Accommodating Change in Enterprise Applications", Thesis, IT-University of Copenhagen, 2002, 110 pages.
Vossen, et al., "The WASA2 Object-Oriented Workflow Management System", SIGMOD '99, Philadelphia PA, 1999, pp. 587-589.
Manolescu, et al., "Dynamic Object Model and Adaptive Workflow", OOPSLA Workshop on Metadata and Active Object Models, 1999, 19 pages.
Chen, et al., "Multi-Agent Cooperation, Dynamic Workflow and XML for E-Commerce Automation", HP Labs Technical Report, HPL-1999-136, Oct. 1999, 10 pages, Software Technology Laboratory, Palo Alto, CA.
Ader, et al., "WooRKS, an Object Oriented Workflow System for Offices" IEEE Bulletin of the Technical Committee on Data Engineering, Mar. 1995,81 pages, Vol.18,No. 1.
Kim, et al., "WW-FLOW: Web based workflow management with runtime encapsulation" IEEE Internet Computing, May-Jun. 2000, pp. 55-64, vol. 4, No. 3.
Miller, et al., "WebWork: METEOR2's Web-based Workflow Management System", Journal of intelligent Information Systems, Special Issue Workflow Management Systems, Mar.-Apr. 1998, pp. 185-215, vol. 10, No. 2.
Windows Workflow Foundation accessible at: http://msdn.microsoft.comlwindowsvistalbuilding!workflow/defaull.aspx, last accessed: Nov. 16, 2005, 4 pages.
International Search Report mailed Jun. 8, 2007, for PCT Application Serial No. PCT/US2006/047220, 8 Pages.
Improving Correctness and Failure Handling in Workflow Management Systems, Kamath, Mohan Umesh, Ph.D., University of Massachusetts Amherst, 1998, 209 Pages; AAT 9841883.
G. Wirtz; M. Weske; H.Giese; The OCoN Approach to Workflow Modeling in Object-Oriented Systems, Information Systems Frontiers, Sep. 2001; 3, 3; ABI/INFORM Global, p. 357-376.
The Workflow Management Coalition—The Workflow Reference Model, Document TC00-1003, Hollingsworth, David, Jan. 19, 1995, pp. 1-55.
Angus, Jeff, "Jet Form's University Deployable Workflow", 1998, Information Week, Iss. 679, p. 104, Pro Quest ID 29161881.
M2 Press Wire, "Team Ware: Team Ware Flow 2.0 Chosen as Product of Choice for Collaboration & Ad-hoc Workflow Apps", Jan. 1998, Coventry, p. 1, ProQuest ID 25682717.
"Conceptual Design and Implementation of a Graphical Workflow-Modeling Editor in the Context of Distributed Groupware-Databases", by Marcus Ott, University of Paderborn Faculty of Business Studies, Germany, May 1994.
"An Evaluation of Methodological Issues in Workflow Management", by Anastasia Sotnikova, Department of Computer Engineering and Information Science and the Institute of Engineering and Science of Bilkent University, Aug. 1998.
"Specification and Implementation of Exceptions in Workflow Management System", by Fabio Casati et al., ACM Transactions on Database System, vol. 24, No. 3, Sep. 1999, pp. 405-451.
"RainMan: A Workflow System for the Internet", Imb T.J. Watson Research Center, Yorktown Heights, NY 1997.
"Window Workflow Foundation Runtime Services: The Persistence Service", http://web.archive.org/web/20051212062613/http://weblogs.asp.net/gsusx/archive/2005/10/05/426699.aspx.
"Action Workflow Enterprise Series 3.0 Process Builder Users Guide", Action Technologies, Inc., 1996.
Dragos A. Manolescu, Workflow enactment with continuation and future objects, In Proceedings of the ACM Conference on Object-Oriented Programming, Systems, Languages, and Applications (OOPSLA), pp. 40-51, Seattle, Washington, USA, 2002.
Paul Andrew et al: "Presenting Windows Workflow Foundation, Beta Edition", Sep. 12, 2005, Sams.
Nick Russel et al: "Workflow Data Patterns", Queensland university of Technology Technical Reports, Apr. 2004, pp. 1-75 http://www.workflowpatterns.com/documentation/documents/data_patterns%20BETA%20TR.pdf.
Matthias Kloppmann et al: "WS-BPEL Extension for People", Jul. 2005, pp. 1-18 http://www.sdn.sap.com/irj/scn/go/portal/prtroot/docs/library/uuid/cfab6fdd-0501-0010-bc82-f5c2414080ed?QuickLink=index&overridelayout=true.
Garcia, Josefina Guerrero, et al., "FlowiXML: A Step Towards Designing Workflow Management Systems", Int J. Web Engineering and Technology, vol. 4, No. 2, 2008, pp. 163-182.
Microsoft, "Streamlined, Customized Workflow Demonstrates Power and Flexibility of Development Platform", Oct. 2007, 12 pages.
Bihler, Pascal, et al., "Supporting Cross-Application Contexts with Dynamic User Interface Fusion", Proceedings of the MoBe Workshop at Informatik 2007, 6 pages.
Hemel, Z., et al., "WebWorkFlow: An Object-Oriented Workflow Modeling Language for Web Applications", 2008, 19 pages.
"Persistent Data Storage with CORBA", by Chris Mayers, ANSA, Poseidon House Castle Park, Cambridge CB3 0RD, UK, Apr. 1996.
"Flexible Persistence Framework for Object-Oriented Middleware", by Mathias Weske and Dominik Kuropka, Hasso Plattner Institute for Software Systems Engineering, Am Luftschiffhafen 1, 14471 Potsdam, Germany. Jun. 25, 2001.
"Openwings Data Services Specification Beta Ver 0.81", General Dynamics Decision Systems, Inc., May 16, 2002.
"A Cooperative Workflow Management System with the Meta-Object Facility", by Le Pallec Xavier and Vantroys Thomas, Laboratoire Trigone—Equipe Noce, Cite Scientifique 59655 Villeneuve D'Ascq Cedex, France, IEEE, 2001.
Ellis, Keddara, Rozenberg; Dynamic Change within Workflow Systems; 1995; ISBN:0-89791-706-5.
Zdancewic et al., "A Language-based Approach to Unifying Events and Threads", http://www.cis.upenn.edu/~stevez/papers/LZ06b.pdf, Apr. 29, 2006, 15 pages.
Pickett et al., "Libspmt: A Library for Speculatie Multithreading", http://www.sable.mcgill.ca/publications/techreports/2007-1/pickett-07-libspmt-TR.pdf, Mar. 12, 2007, 22 pages.
Savinov, "Concept as a Generalization of Class and Principles of the Concept-Oriented Programming", http://conceptoriented.com/savinov/publicat/csjm_05.pdf, 2005, 43 pages.
Bhoedjang, "Communication Architectures for Parallel-Programming Systems", http://dare.ubvu.vu.nl/bitstream/1871/11711/5242.pdf, 2000, 282 pages.
Bukovics, "Pro WF Windows Workflow in .NET 3.5", Jun. 26, 2008, Apress, ISBN 978-1-4302-0975; Chapters 1-19, 852 pages.
U.S. Appl. No. 11/321,490, Sep. 22, 2008, Office Action.
U.S. Appl. No. 11/321,490, May 22, 2009, Office Action.
U.S. Appl. No. 11/321,490, Sep. 17, 2009, Office Action.
U.S. Appl. No. 11/321,820, Oct. 14, 2009, Office Action.
U.S. Appl. No. 11/321,777, Dec. 9, 2008, Office Action.
U.S. Appl. No. 11/321,777, Jul. 9, 2009, Office Action.
U.S. Appl. No. 11/321,777, Dec. 11, 2009, Notice of Allowance.
U.S. Appl. No. 11/321,789, Feb. 26, 2010, Office Action.
U.S. Appl. No. 11/321,490, Mar. 19, 2010, Office Action.
U.S. Appl. No. 11/321,820, Mar. 15, 2010, Office Action.
U.S. Appl. No. 11/321,789, Jul. 21, 2010, Office Action.
U.S. Appl. No. 11/321,820, Jul. 20, 2010, Office Action.
U.S. Appl. No. 11/321,820, Nov. 23, 2010, Office Action.
U.S. Appl. No. 11/321,789, Jun. 21, 2011, Office Action.
U.S. Appl. No. 12/487,212, Sep. 26, 2011, Office Action.
U.S. Appl. No. 11/321,789, Dec. 12, 2011, Office Action.
U.S. Appl. No. 11/321,820, Apr. 30, 2012, Office Action.
U.S. Appl. No. 12/487,212, May 2, 2012, Office Action.
U.S. Appl. No. 11/321,490, Sep. 21, 2012, Office Action.
U.S. Appl. No. 11/321,490, Mar. 1, 2013, Office Action.
U.S. Appl. No. 12/345,288, Jun. 7, 2012, Office Action.
U.S. Appl. No. 12/345,288, Oct. 11, 2012, Notice of Allowance.
Notice of Allowance dated May 21, 2014 cited in U.S. Appl. No. 11/321,490.
Office Action dated Mar. 21, 2014 cited in U.S. Appl. No. 12/487,212.

(56) References Cited

OTHER PUBLICATIONS

Office Action dated Nov. 29, 2013 cited in U.S. Appl. No. 11/321,490.
Office Action dated Jan. 3, 2014 cited in U.S. Appl. No. 12/345,288.
U.S. Appl. No. 14/497,799, filed Sep. 26, 2014, Sanabria et al.
Russell, et al., "Workflow Data Patterns", In Queensland University of Technology Technical Reports, Apr. 2004, pp. 1-75.
"First Office Action Issued in India Patent Application No. 2201/CHENP/2008", Mailed Date: Feb. 6, 2015, 2 pages.
U.S. Appl. No. 12/345,288, Sep. 10, 2014, Office Action.
Office Action dated Oct. 15, 2014 cited in U.S. Appl. No. 12/487,212.
Oracle, "Analytic Calculation Engine Metadata Classes", Mar. 2007, pp. 1-70.
Office Action dated Aug. 5, 2015 cited in U.S. Appl. No. 12/345,288.
Notice of Allowance dated Feb. 3, 2016 cited in U.S. Appl. No. 12/345,288.
Office Action dated Oct. 4, 2016 cited in U.S. Appl. No. 14/497,799.

\* cited by examiner

HOST AGNOSTIC MESSAGING IN A CONTINUATION BASED RUNTIME

BACKGROUND

Background and Relevant Art

Computers and computing systems have affected nearly every aspect of modern living. Computers are generally involved in work, recreation, healthcare, transportation, entertainment, household management, etc.

Some computing systems implement functionality by employing a continuation based runtime, also known as a workflow. A continuation based runtime executes activities. An activity is defined by a unit of executable code including one or more pulses of work. One of the ways an activity can execute multiple pulses of work is through the scheduling of child activities. A composite activity that includes a number of child activities enables custom control flows that can be implemented by scheduling child activities 0, 1 or n times as determined by the composite activity. Beyond this flexibility to create new control flows, activities have the following characteristics: Activities have no process affinity i.e., they can be paused and resumed in a different process. Activities have no thread affinity, i.e., different pulses of work can be run on different threads. Activities can be persisted and rehydrated, e.g., an activity can be stored to disk in a dormant state and later restored to active runtime.

A continuation based runtime enables running long-running durable programs authored declaratively. These programs often communicate with the outside world by sending and receiving messages. Given the long running and episodic execution characteristics of programs in a continuation based runtime, a complete messaging stack implements the ability to correlate inbound messages with running workflow instances. These workflow instances might reside in memory or be persisted in a repository. Messaging primitives and capabilities have strong dependencies on the host, as it provides the runtime environment to process them. A program written as a composition of activities (authoring primitives within a continuation based runtime) conveys intent; however, some activities (like the messaging activities) use interaction with the host during runtime. This is problematic as it is desirable to express a process in general terms, but the program ends up being coupled to a particular host to properly execute and is not done in a host independent way. Rather, the messaging is done in a way that is specific to a specific host.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein relates to a method of sending or receiving messages in a host agnostic way in a continuation based runtime. The method includes defining a contract between a continuation based runtime and host for sending or receiving a message. The contract defines one or more of: details about what should be included in the messages, operations for sending the message; operations for receiving the message, parameters for cancellation of inflight operations, or notifications about correlation information lifetime. The method further includes identifying a correlation handle. The correlation handle uniquely identifies an executing instance of an activity. The method further comprises identifying a bookmark. The bookmark defines where the continuation based runtime should resume after sending or receiving the message. The method further comprises calling the contract using the correlation handle and the bookmark to allow the message to be correctly routed by the host and for the continuation based runtime to be correctly resumed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
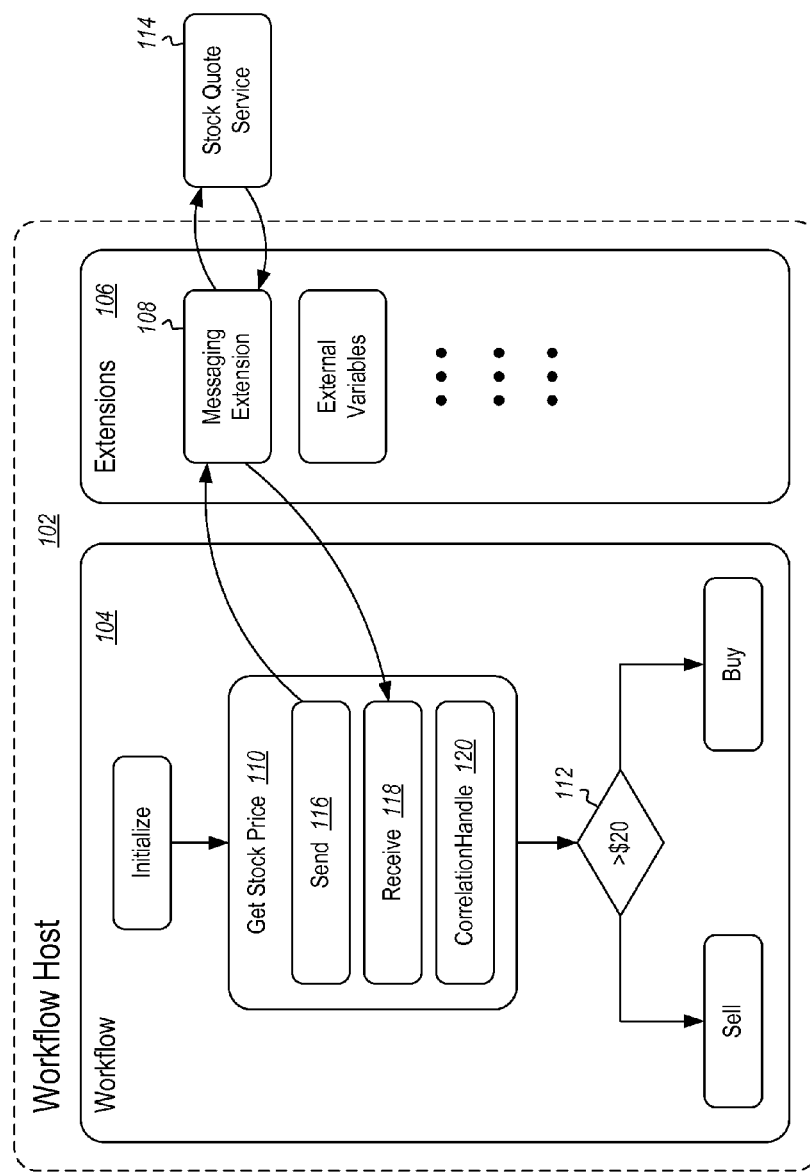
FIG. 1 illustrates the use of extensions to send and receive messages from a workflow in a host agnostic way.

Embodiments described herein may implement a single messaging abstraction across different hosts in a host agnostic fashion. This may allow for a single implementation across different specific hosts as well as different types of hosts. For example, embodiments may be able to perform similar functionality whether the host is an enterprise host, a cloud host, an individual machine, etc. Embodiments may implement an extension model for messaging. Additionally or alternatively, embodiments may allow for pluggability when correlation is implemented in a host. Additionally or alternatively, embodiments may allow for pluggability when messages are sent relative to idle points in a workflow. Additionally or alternatively, embodiments may allow for pluggability when faults are constructed.

A continuation based runtime executes activities. An activity represents a unit of executable code including one or more pulses of work. Users of the continuation based runtime are provided with a library of activities that they can use to write their programs. Embodiments may be implemented where some activities within this library provide messaging capabilities enabling sending and receiving messages to and from the outside world. Some embodiments may be implemented on top of Windows Workflow Foundation (WF) available from Microsoft® Corporation of Redmond Wash., an existing implementation of a continuation based runtime framework.

Illustrating now functionality of some embodiments, assume that the activity library mentioned above has activities that represent inbound and outbound operations that can be used to write programs within the continuation based runtime. Inbound operations can be configured to correlate the message to an existing workflow instance. These activities may be referred to herein as "send" and "receive." These activities provide an authoring facade that composes other lower level activities that perform different aspects of the actual work involved with sending and receiving messages (e.g., formatting, sending messages over the wire, etc.)

Given the above described activities, a concrete example is now illustrated. In the present example, a vacation approval process for a company is illustrated. At some stage during its execution, the process will receive and send messages. An example of such stage can be a "wait for manager approval" stage, where the process will wait for a manager to provide their assessment on the request. This step can be modeled using an activity that receives an inbound message (e.g., a "receive" activity). The concept and timing within the process for that manager approval are independent of the host and hence its description could be expressed independent of which host it will be executed (as the program is being authored declaratively by composing activities that express the program intent). In fact, the description could be the same irrespective of which host it will be executed on. Further, these activities can be configured to initialize or follow a correlation that is also host-agnostic.

Some embodiments may implement a workflow framework that has a programming model for activities to use services provided by a hosting application. These services, in the illustrated example, are called extensions. Embodiments may leverage that mechanism such that when a well known extension is present it is retrieved and invoked by the messaging activities following a strict protocol. The extension abstracts each one of the primitive steps involved in sending, receiving, and correlating messages. The extension may be provided by the host. In some embodiments, it is a responsibility of the host to provide the right extension and it is a responsibility of the messaging activities to invoke the members of the extension in the correct order, following a protocol that governs how the methods in the extension are invoked.

Embodiments may be configured to send or receive messages in a host agnostic way in a continuation based runtime. This may be done by defining a contract between a continuation based runtime and host for sending or receiving a message. The contract defines information such as details about what should be included in the messages; operations for sending the messages; operations for receiving the messages; parameters for cancellation of inflight operations; and/or notifications about correlation information lifetime.

Embodiments may identify a correlation handle. The correlation handle uniquely identifies an executing instance of an activity. For example, as illustrated above in the vacation request example, an employee ID may be used as the correlation handle. This allows a continuation based runtime to resume activities for the correct employee (for example if multiple employees have requested vacation) when a particular message is sent or received. In other embodiments, various other unique identifiers may be used. The correlation handle may be assigned as part of the workflow activities rather than handled independently by the host.

Embodiments may further include identifying a bookmark. The bookmark defines where the continuation based runtime should resume after sending or receiving a message. This allows activities to resume at the correct location in the continuation based runtime when a message is sent or received.

Thus, embodiments can call the contract using the correlation handle and the bookmark to allow the message to be correctly routed by the host and for the continuation based runtime to be correctly resumed.

In some embodiments, the same correlation handle can be used by multiple executing activities. For example, embodiments could have a Parallel with one branch Receiving a UpdateOrder for order_id=123 and the other branch receiving a CancelOrder for order_id=123. Both of them would reference the same correlation handle but have distinct actions. The bookmark would be identified by a combination of the action and the correlation handle. Thus, the bookmark maps 1:1 with an executing instance of an activity. In particular, the correlation handle and other information result in a mapping to a bookmark, which is then used for execution resumption.

The code below illustrates an example contract outline that may be made to facilitate functionality as described above. The inline comments describe when the activities will call the methods on this extension.

```
public abstract class SendReceiveExtension
{
    /// This property allows the extension to provide values for host
    /// level settings.
    public abstract HostSettings HostSettings { get; }
    /// This method is called by the Send and SendReply activities. When this
    /// method returns the activity enters idle state until the message is sent
    /// and the associated bookmark is resumed by the host/extension.
    public abstract void Send(MessageContext message, SendSettings settings,
    InstanceKey correlatesWith, Bookmark sendCompleteBookmark);
    /// This method is called by the Receive and ReceiveReply activities after
    /// they create a bookmark. When the method returns, the activity enters idle
    /// state until the message is received and the associated bookmark is resumed
    /// by the host/extension.
    public void RegisterReceive(ReceiveSettings settings, InstanceKey
correlatesWith,
    Bookmark receiveBookmark);
```

```
/// This method is called when a correlation handle goes out of scope allowing
/// the extension to clean-up any associated state.
public abstract void OnUninitializeCorrelation(
InstanceKey correlationKey);
/// This method is called by the RegisterReceive method.
protected abstract void OnRegisterReceive(ReceiveSettings settings,
InstanceKey correlatesWith, Bookmark receiveBookmark);
/// This method is called by the Send and Receive activities. It is called
/// if the activity is canceled or aborted while waiting for an associated
/// bookmark to resume.
public abstract void Cancel(Bookmark bookmark);
}
/// An instance of this class is passed as parameter to the extension methods. It
/// is also expected as the state that gets passed in when a Receive/ReceiveReply
/// bookmark is resumed by the extension.
public class MessageContext
{
  public MessageContext( )
  public virtual Message Message { get; protected set;}
  public virtual Guid EndToEndTracingId { get; set; }
}
/// An instance of this class is passed as a parameter to the Send method of the
/// extension. It holds values for properties configured on the Send/SendReply
/// activities.
public sealed class SendSettings
{
  public SendSettings( );
  // Send settings
  public bool IsOneWay { get; set; }
  public Endpoint Endpoint { get; set; }
  public Uri EndpointAddress { get; set; }
  public string EndpointConfigurationName { get; set; }
  public TokenImpersonationLevel TokenImpersonationLevel { get; set; }
  public ProtectionLevel? ProtectionLevel { get; set; }
  public bool RequirePersistBeforeSend { get; set; }
}
/// An instance of this class is passed as a parameter to the RegisterReceive
/// method of the extension. It holds values for properties configured on the
///Receive activity.
public sealed class ReceiveSettings
{
  public ReceiveSettings( );
  public string Action { get; set; }
  public bool CanCreateInstance { get; set; }
}
/// This class has host specific settings that the messaging activities
/// would use at runtime.
public sealed class HostSettings
{
  public HostSettings( );
  public bool IncludeExceptionDetailInFaults { get; set; }
  public bool UseNoPersistHandle { get; set; }
  public XName ScopeName { get; set; }
}
```

Workflow primitives, such as send and receive, may not know various details about a specific host on which the workflow is executing. Rather, the workflow primitives use a contract. This may be used as part of a send/receive extension that the host and activities rendezvous on. In particular, using the contract, workflow activities can know that the host can satisfy messaging functionality.

As illustrated above, the contract includes details for host level settings. Host settings may include, for example, exception details for faults, indication that an activity should persist before sending, or other details. For example, the host may indicate to the workflow that an activity should be persisted before a message is sent to the host for external messaging.

The contract may include details for sending. This allows the host to specify how messages should be provided to the host. The workflow can simply send messages to the host for sending according to the contract and can be agnostic to how or when the host actually sends the messages. The workflow simply indicates, using an outbound contract, that the host should send the message and provides a bookmark for the host to call to when the send operation is completed. The outbound contract can be used irrespective of whether a sent message is an initial request, response to other message, or other type of outgoing message from the workflow.

As illustrated above, the contract may include an inbound contract. The inbound contract allows the workflow to provide a bookmark and correlation handle (such as an identifier described above) for received messages. The host can provide inbound messages to the appropriate workflow and even the appropriate activity of the workflow by matching on the bookmark and correlation handle.

Embodiments may include functionality for indicating that a correlation handle has gone out of scope. For example, the OnUninitializeCorrelation method described above may be used for this purpose. This is a mechanism for a workflow to notify a host that based on business logic, a correlation handle is now out of scope. In particular, this mechanism can be used to manage correlation lifetimes. For example, embodiments may be configured to correlate using a tracking ID provided by a shipping company. Once the package has been delivered, the tracking ID may be recycled by the shipping company such that the correlation would then be invalid. The workflow can notify the host of the delivery to indicate that the tracking ID is now out of scope and should not be used for correlation for future messages.

Embodiments may include a cancel method. The cancel method allows the workflow to cancel sending a message or receiving a message. For example, if a workflow is cancelled, there may no longer be a need to send or receive some message. The cancel method can be used by the workflow to indicate to the host that a message should not be sent or received.

Embodiments may include other methods to specify how information about how message should be sent and received. For example, a workflow can specify whether a message is a one way message or a two way message, what security should be used to send or receive the message, where to send the message, etc.

Embodiments may allow for an open ended model where a new host can plug in its own extension. The model can abstract the core primitives used for sending, receiving, and correlating messages and expose them to the host author, allowing the host author to provide his own implementation. For example, a host author might decide to send the messages right away during the execution of the activity. Alternatively, other host authors may collect the messages and send them all together in a batch when the program becomes idle. Alternatively, other host authors may collect the messages and send them all together in a batch when sending operations are less expensive in terms of use of computing or network resources.

By implementing workflows as described above, embodiments can create workflows that use messaging and can be processed across different hosts, given a messaging surface, such as "send" and "receive" illustrated above, that facilitates different implementations for how the messages are actually sent, or change just one part of the underlying messaging implementation (e.g., change how correlation works).

Referring now to FIG. 1, an illustrative example is illustrated. FIG. 1 illustrates a workflow host 102 hosting a workflow 104. The workflow 104 may call to various extensions 106, including a messaging extension 108. In the example, illustrated, the workflow 104 is configured to get a stock price quote 110 and to make a decision 112 about whether or not to buy or sell the stock. In particular, the decision is based on the price. If the price is greater than $20, then the decision 112 indicates that the stock should be sold. If the price is less than or equal to $20, then the decision 112 indicates that the stock should be bought. Note that in some embodiments, sell and buy may be implemented with Send/Receive.

To get the stock quote, the workflow calls to the messaging extension 108, which then calls to a stock quote service 114. The stock quote service 114 returns a stock quote to the messaging extension 108, which can then be sent back to the workflow 104.

As there may be several workflows receiving stock quotes, it is important that each of the stock quotes returns, through the messaging extension 108, to the proper workflow and the proper point in the workflow. As illustrated in FIG. 1, this may be accomplished using an appropriate contract. FIG. 1 illustrates portions of a contract, including an Internal Send Message portion 116, an Internal Receive Message portion 118 and a Correlation Handle 120. These can be used, as described earlier, to dictate how messages are sent and received, and to provide a correlation tool to determine how received messages are matched back up with the proper workflow.

Figure 2:
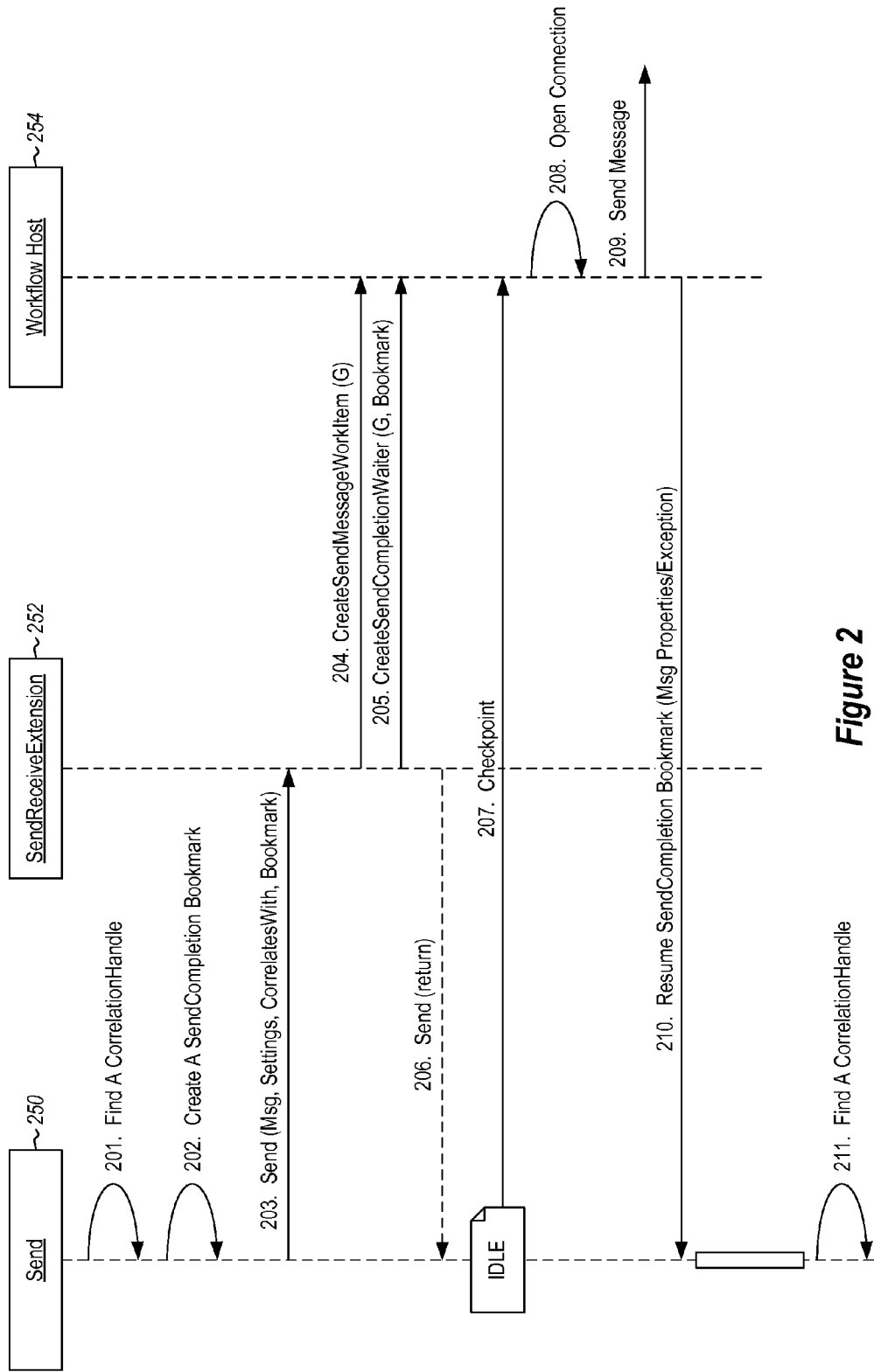
FIG. 2 illustrates a message flow diagram for sending a message.
Figure 3:
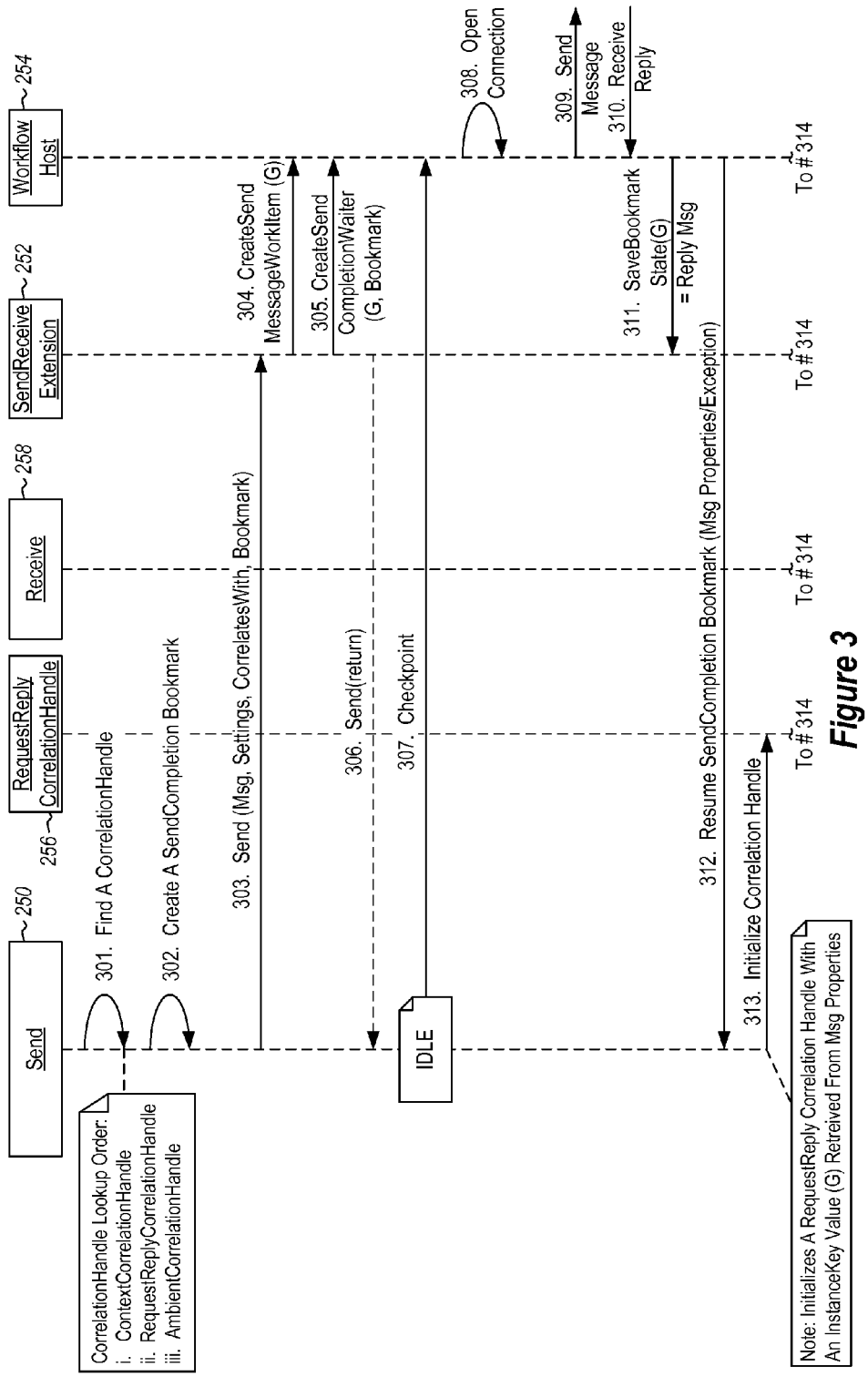
FIG. 3 illustrates a message flow diagram for sending a message and receiving a response.
Figure 3:
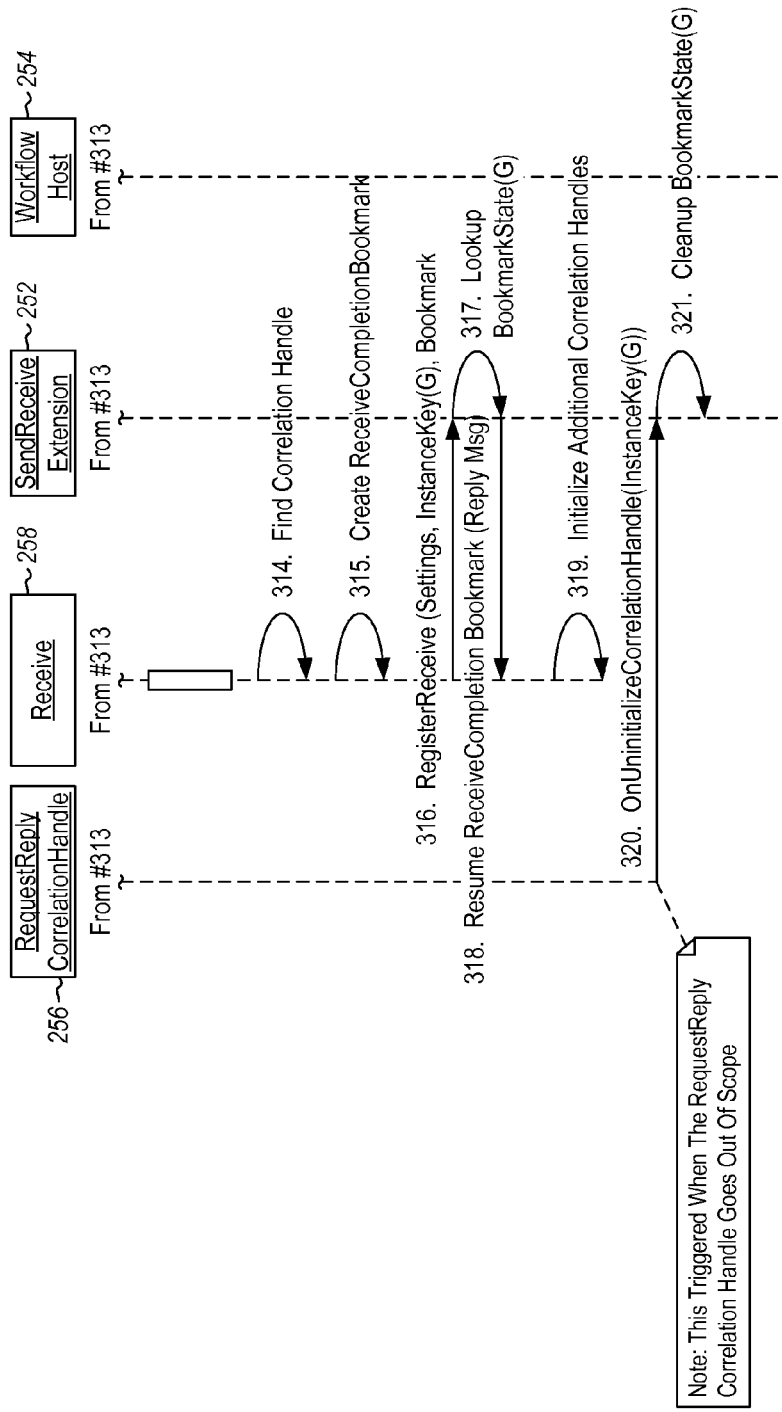
Figure 4:
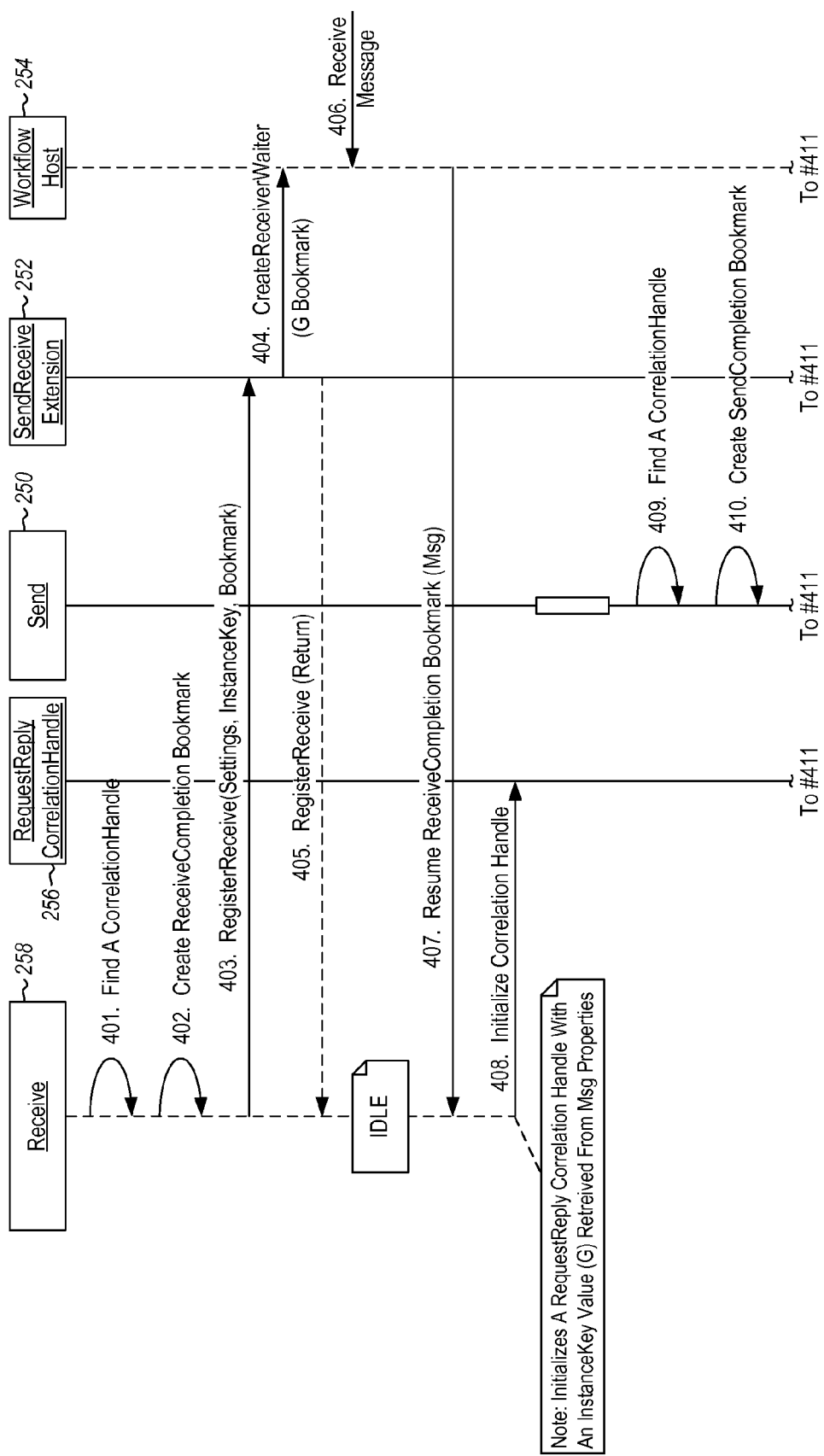
FIG. 4 illustrates a message flow diagram for receiving a message and sending a response.
Figure 4:
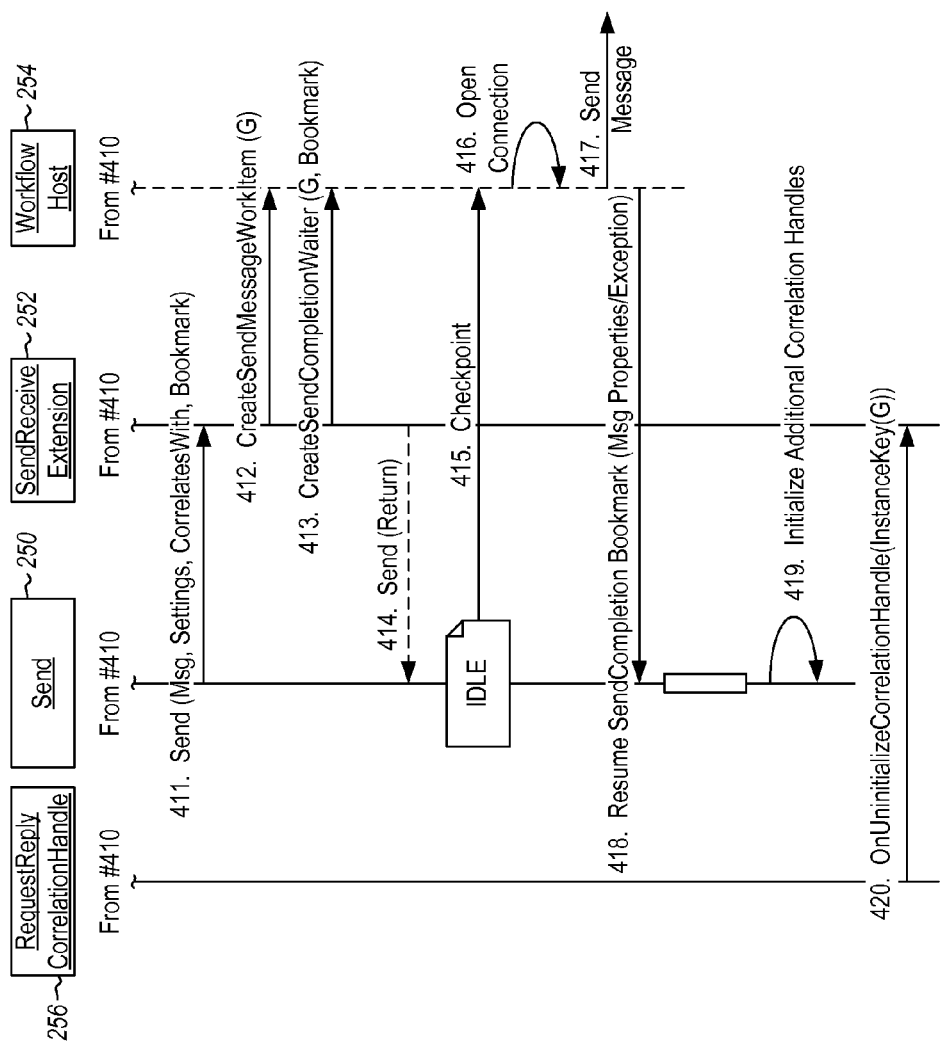

Referring now to FIGS. 2-4, various flow diagrams generically showing how messages might be sent and received between hosts and workflows are illustrated. With reference to FIG. 2, an example is illustrated showing a messaging operation. The messaging operation is shown in the context of, an activity 250 in a workflow, a send/receive extension 252 and a workflow host 254. The send/receive extension 252 is a rendezvous point between the activity 250 and the workflow host 254. Business logic can be implemented by activities, such as activity 250.

As illustrated at 201, the activity will find a correlation handle, such as a unique identifier, on which to correlate inbound and/or outbound messages.

As illustrated at 202, a bookmark is created. This bookmark identifies a location where processing will resume once a message has been sent by the host.

As illustrated at 203, the message, along with the correlation handle and the bookmark are sent to the send/receive extension 252.

At 204 and 205 the send/receive extension 252 coordinates messaging actions with the host 254. At 206, the send/receive extension 252 may optionally return information to the activity 250 indicating that the host is ready to send a message from the activity 250.

At 207, the activity 250 may go into an idle state. This may allow the host to perform various contract specified actions, such as persisting activities or other actions.

At 208, a connection for sending a message is opened by the host. At 209 the message is sent by the host 254. This causes the activity 250 to be resumed at the bookmark as illustrated at 210. The bookmark can be resumed with success or failure. Failure modes and exceptions can be defined by the contract.

At 211, and for completeness, an initialization of correlation handles is illustrated. This is shown to illustrate that in some embodiments, the mechanism for correlation is provided by the underlying transport and is not known until sending and thus the correlation handles may not be able to be fully populated until the message is sent.

Another example is illustrated in FIG. 3. FIG. 3 illustrates sending a message and receiving a reply. In FIG. 3, actions 301, 302, 303, 304, 305, 306, 307, 308, and 309 are similar to actions 201, 202, 203, 204, 205, 206, 207, 208, and 209 illustrated in FIG. 2. However, in the present example, a reply may be expected as a result of sending a message. For example, an HTTP request message will generally result in an HTTP response message on the established TCP connection.

Thus, FIG. 3 illustrates the case where a reply is received as illustrated at 310. At 311 the host can correlate the reply to the bookmark. Act 312 is similar to act 210 illustrated in FIG. 2.

A workflow may have an activity 258 configured for receiving messages. This activity can be used to receive the reply. FIG. 3 illustrates at 314 finding a correlation handle for receiving the reply. At 315 a bookmark is created for receiving the reply. At 316 the activity 258 registers with the send/receive extension 252, including providing various receive settings, an identifier, and a bookmark. At 317, the host 254 can look up the bookmark state. At 318, the send/receive extension 252 can return the reply to the activity 258. Similar to what is shown at 211, at 319 the activity 258 can initialize correlation handles.

FIG. 3 further illustrates the use of scope management as discussed above. Inasmuch as the reply has been received, any messages correlating to the correlation handle will be out of scope. Thus, such an indication can be made as illustrated at 320 and the bookmark can be cleaned up at 321. While the illustrated example has shown that the correlation handle has a lifetime of a single send/receive cycle, it should be appreciated that in other embodiments, a correlation handle may have a longer lifetime.

Referring now to FIG. 4, FIG. 4 illustrates the reverse of FIG. 3, namely, when a request is received by a workflow and the workflow responds with a reply. Thus, steps 401, 402, 403 perform functionality similar to that illustrated in steps 314, 315, and 316 illustrated in FIG. 3. Step 404 is similar to step 304 shown in FIG. 3. Step 406 is similar to step 310. Step 407 is similar to step 318. Step 408 is similar to step 319. Steps 409, 410, 411, 412, 413, 414, 415, 416, 417, and 418 are similar to steps 301, 302, 303, 304 305, 306, 307, 308, 309, and 312 respectively. Step 419 is similar to step 313. And step 420 is similar to step 320. Note that while the examples illustrated in FIGS. 3 and 4 share some characteristics, they also have some differences. For example, FIG. 3 illustrates waiting for a response message while FIG. 4 illustrates waiting for an arbitrary inbound message. As such the cleanup and scoping logic may be different for the different embodiments.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
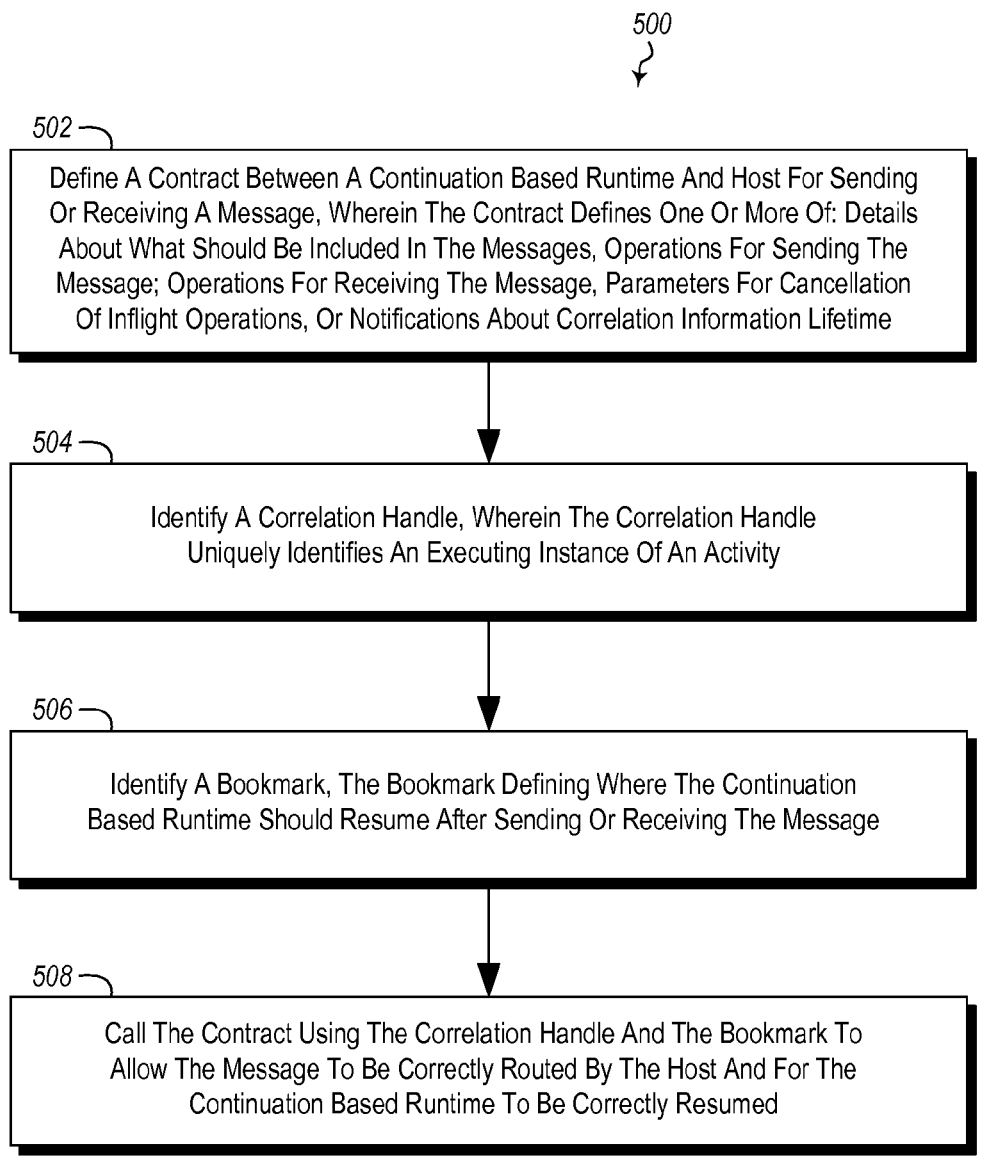
FIG. 5 illustrates a method of sending or receiving messages in a host agnostic way in a continuation based runtime.

Referring now to FIG. 5, a method 500 is illustrated. The method 500 includes acts for sending or receiving messages in a host agnostic way in a continuation based runtime. The method includes defining a contract between a continuation based runtime and host for sending or receiving a message (act 502). The contract defines one or more of (or all of): details about what should be included in the messages, operations for sending the message; operations for receiving the message, parameters for cancellation of inflight operations, or notifications about correlation information lifetime. Such a contract, with the various methods that can be called to implement the contract, is shown by the code example illustrated above.

The method 500 further includes identifying a correlation handle (act 504). The correlation handle uniquely identifies an executing instance of an activity. For example, the correlation handle may be an employee number, a tracking number, a globally unique identifier (guid) etc. Notably, unique is not necessarily unique over all time or all space. Unique may be contextually unique. For example, a tracking number may be reused and thus is not unique over all time. Rather, the tracking number may be unique within a particular timeframe until a package associated with the tracking number is delivered. In fact, some embodiments include functionality for indicating that a correlation handle is no longer in scope thus ending any dependencies on the uniqueness of the correlation handle.

The method 500 further includes identifying a bookmark (act 506). The bookmark defines where the continuation based runtime should resume after sending or receiving the message. The method 500 further includes calling the contract using the correlation handle and the bookmark to allow the message to be correctly routed by the host and for the continuation based runtime to be correctly resumed (act 508).

The method 500 may be practiced where the method includes sending the message. Calling the contract includes providing message payload details. An example of this is illustrated at 203 in FIG. 2 where message details, along with other settings, the correlation handle, and the bookmark are sent.

The method 500 may be practiced where the method includes receiving the message. Calling the contract includes providing a receive operation description. For example, FIG. 3 illustrates at 316 where receive settings are registered to indicate how receive operations are performed.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A host agnostic method of communicating messages in a continuation based runtime, the method comprising:
accessing a defined contract, wherein the contact associates a continuation based runtime and a first host, wherein the first host is hosting the continuation based runtime, wherein the contract is associated with sending or receiving a message, wherein the contract defines host specific functionality for the first host, wherein the contract comprises an extension provided by the first host that identifies services provided by the first host such that activities of the continuation based runtime hosted on the first host can invoke members of the extension for the first host following a protocol that governs how the methods in the extension are invoked, wherein a correlation handle and a bookmark are registered with the extension;
identifying the correlation handle, that uniquely identifies an executing instance of an activity;
identifying the bookmark that comprises a resume location for the continuation based runtime after the message communication is complete;
calling the contract using the correlation handle and the bookmark to allow the message to be correctly routed by the first host using host specific functionality specified in the contract,
wherein calling the contract includes calling the extension using the contract, the correlation handle and bookmark; and
calling the service from the extension.

2. The method of claim 1, wherein the method comprises sending the message, and wherein calling the contract comprises providing message payload details.

3. The method of claim 1, wherein the method comprises receiving the message, and wherein calling the contract comprises providing a receive operation description.

4. The method of claim 1, wherein calling the contract comprises obtaining host level settings for a particular host.

5. The method of claim 1, further comprising indicating that the correlation handle has gone out of scope such that future instances of an identifier that is the same as the correlation handle are not associated with the contract.

6. The method of claim 1, further comprising cancelling sending or receiving the message.

7. The method of claim 6, wherein cancelling is performed as a result of cancelling a workflow activity.

8. In a computing environment, one or more physical computer readable storage media comprising computer executable instructions that when executed, by one or more processors cause one or more processors to perform the following:
accessing a defined contract, wherein the contract associates a continuation based runtime and a first host, wherein the first host is hosting the continuation based runtime, wherein the contract is associated with sending or receiving a message, wherein the contract defines host specific functionality for the first host, wherein the contract comprises an extension provided by the first host that identifies services provided by the first host such that activities of the continuation based runtime hosted on the host can invoke members of the extension for the specific first host following a protocol that governs how the methods in the extension are invoked, wherein a correlation handle and a bookmark are registered with the extension;
identifying the correlation handle, that uniquely identifies an executing instance of an activity;
identifying the bookmark that comprises a resume location for the continuation based runtime after the message communication is complete;
calling the contract using the correlation handle and the bookmark to allow the message to be correctly routed by the first host, using host specific functionality specific in the contract, wherein calling the contract includes calling the extension using the contract, the correlation handle and bookmark; and
calling the service from the extension.

9. The one or more computer readable media of claim 8, comprising computer executable instructions that when executed by one or more processors cause one or more processors to send the message, and wherein calling the contract comprises providing message payload details.

10. The one or more computer readable media of claim 8, comprising computer executable instructions that when executed by one or more processors cause one or more processors to receive the message, and wherein calling the contract comprises providing a receive operation description.

11. The one or more computer readable media of claim 8, wherein calling the contract comprises obtaining host level settings for a particular host.

12. The one or more computer readable media of claim 8, further comprising computer executable instructions that when executed by one or more processors cause one or more processors to indicate that the correlation handle has gone out of scope such that future instances of an identifier that is the same as the correlation handle are not associated with the contract.

13. The one or more computer readable media of claim 8, further comprising computer executable instructions that when executed by one or more processors cause one or more processors to cancel sending or receiving the message.

14. The one or more computer readable media of claim 13, wherein cancelling is performed as a result of cancelling a workflow activity.

15. A computing system configured to send or receive messages in a host agnostic way in a continuation based runtime, the system comprising:
one or more processors;
one or more computer readable media coupled to the one or more processors, wherein tile one or more computer readable media comprise computer executable instructions that when executed by one or more of the one or more processors cause one or more of the one or more processors to perform the following:
accessing a defined contract, wherein the contract associates a continuation based runtime and a first host, wherein the first host is hosting tile continuation based runtime, wherein the contract is associated with sending or receiving a message, wherein the contract defines host specific functionality for the first host, wherein the contract comprises an extension provided by the first host that identifies services provided by the first host such that activities of the continuation based runtime hosted on the first host can invoke members of the extension for the first host following a protocol that governs how the methods in the extension are invoked, wherein a correlation handle and a bookmark are registered with the extension;
identifying the correlation handle, that uniquely identifies an executing instance of an activity;
identifying the bookmark that comprises a resume location for the continuation based runtime after the message communication is complete;
calling the contract using the correlation handle and the bookmark to allow the message to be correctly routed by the first host, using host specific functionality specified in the contract,
wherein calling the contract includes calling the extension using the contract, the correlation handle and bookmark; and
calling the service from the extension.

16. The computing system of claim 15, the one or more computer readable media comprising computer executable instructions that when executed by one or more of the one or more processors cause one or more of the one or more processors to send the message, and wherein calling the contract comprises providing message payload details.

17. The computing system of claim 15, the one or more computer readable media comprising computer executable instructions that when executed by one or more of the one or more processors cause one or more of the one or more processors to receive the message, and wherein calling the contract comprises providing a receive operation description.

18. The computing system of claim 15, wherein calling the contract comprises obtaining host level settings for a particular host.

19. The computing system of claim 15, the one or more computer readable media comprising computer executable instructions that when executed by one or more of the one or more processors cause one or more of the one or more processors to indicate that the correlation handle has gone out of scope such that future instances of an identifier that is the same as the correlation handle are not associated with the contract.

20. The computing system of claim 15, the one or more computer readable media comprising computer executable instructions that when executed by one or more of the one or more processors cause one or more of the one or more processors to cancel sending or receiving the message.

21. The method of claim 1, wherein the host specific details comprise at least one of details about what should be included in the messages for the first host, details about operations for sending the message for the first host; details about operations for receiving the message for the first host, details about parameters for cancellation of inflight operations for the first host, or details about notifications about correlation information lifetime for the first host.

* * * * *